(12) United States Patent
Ament et al.

(10) Patent No.: US 7,691,339 B2
(45) Date of Patent: *Apr. 6, 2010

(54) CATALYST TEMPERATURE CONTROL VIA MICROWAVE-INDUCED PARTICLE OXIDATION

(75) Inventors: Frank Ament, Troy, MI (US); Eugene V. Gonze, Pinckney, MI (US); Michael J. Paratore, Jr., Birmingham, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1160 days.

This patent is subject to a terminal disclaimer.

(21) Appl. No.: 10/304,311

(22) Filed: Nov. 26, 2002

(65) Prior Publication Data

US 2004/0101451 A1 May 27, 2004

(51) Int. Cl.
*B01D 50/00* (2006.01)
*B01D 46/00* (2006.01)

(52) U.S. Cl. ............... 422/171; 55/282.3; 55/385.3

(58) Field of Classification Search .......... 422/171, 422/177, 180; 60/299, 300, 303; 55/282.3, 55/385.3, 523–524, DIG. 10, DIG. 30
See application file for complete search history.

(56) References Cited

U.S. PATENT DOCUMENTS

| 5,074,112 | A | * | 12/1991 | Walton et al. ............... 60/303 |
| 5,194,078 | A | * | 3/1993 | Yonemura et al. ........... 55/523 |
| 5,709,722 | A | * | 1/1998 | Nagai et al. ................. 55/524 |
| 5,822,977 | A | * | 10/1998 | Fukuda et al. ............... 60/274 |
| 6,328,779 | B1 | * | 12/2001 | He et al. ............... 55/DIG. 30 |
| 6,709,489 | B2 | * | 3/2004 | Ament et al. .......... 55/DIG. 10 |
| 6,854,261 | B2 | * | 2/2005 | Williamson et al. .......... 60/300 |

FOREIGN PATENT DOCUMENTS

JP 07150928 A * 6/1995
WO WO 01/12320 * 2/2001

* cited by examiner

*Primary Examiner*—Tom Duong

(57) ABSTRACT

A particulate filter system for an internal combustion engine including a particulate trap, microwave-absorbing materials located in the particulate trap, and a NOx catalyst located in said particulate trap.

11 Claims, 5 Drawing Sheets

CATALYST TEMPERATURE CONTROL VIA MICROWAVE-INDUCED PARTICLE OXIDATION

TECHNICAL FIELD

The present invention relates to a diesel particulate trap. More specifically, the present invention relates to a method and apparatus for regenerating a diesel particulate trap.

BACKGROUND OF THE INVENTION

Increased regulation has reduced the allowable levels of particulates and NOx components generated by diesel engines and similar internal combustion engines. Particulates can generally be characterized as a soot that may be captured and oxidized by particulate filters or traps. Present particulate filters or traps contain a separation medium with tiny pores that capture particles. As trapped material accumulates in the particulate trap, resistance to flow in the particulate trap increases, generating back pressure. The particulate trap must then be regenerated to burn off the particulates/soot in the particulate trap to eliminate the back pressure and allow air flow through the particulate trap. Past practices of regenerating a particulate trap utilized an energy source such as a burner or electric heater to generate combustion in the particulates. Particulate combustion in a diesel particulate trap by these past practices has been found to be difficult to control and may result in an excessive temperature rise.

SUMMARY OF THE INVENTION

The present invention relates to a method and apparatus for regenerating a diesel particulate trap using microwaves to control particulate matter/soot and NOx emissions.

Under lean operating conditions such as found in diesel engines, direct injection engines, or engines operating under lean stratified conditions, a NOx trap is used to capture NOx emission from the exhaust gas flow. Periodically (once the NOx trap is saturated or at some predetermined threshold), the air-fuel mixture is adjusted to a rich mixture to regenerate the NOx trap and chemically reduce the NOx trapped in the NOx trap as seen in FIG. 5. Hydrocarbons and carbon monoxide generated by the rich air-fuel mixture will react with the released NOx to reduce the NOx into nitrogen $N_2$ and oxygen $O_2$. The frequency of NOx trap regeneration is calibrated as a function of the capacity of the NOx trap.

Diesel exhaust temperatures are often below desired catalyst operating temperatures required to operate a NOx trap. The present invention, in the preferred embodiment, uses concentrated particulate matter ignited by microwave radiation to initiate the burn-off of particulates/soot in a particulate trap. In alternate embodiments of the present invention, microwave-absorbing materials may be heated by microwave radiation to initiate the burn-off of particulates in a particulate trap. The thermal energy generated by particle matter oxidation heats a catalyst, such as a NOx catalyst, to allow optimal catalyst performance. The present control strategy assists the catalyst in reaching its operating temperature after a cold start. Furthermore, high temperature extremes common to diesel particulate filter regeneration are limited by the present invention to protect catalysts from thermal damage by limiting soot/particulate loading.

The present invention includes a particulate trap placed in the exhaust flow of a diesel engine. A microwave source may be operatively coupled to an antenna, wave guide and/or a focus ring to direct the microwaves to particulate matter or microwave-absorbing materials in the particulate trap. The concentrated particulate matter or microwave-absorbing material generates heat in response to incident microwaves to burn off particulates. Materials transparent to microwaves are preferably used for the basic construction of the particulate trap housing and other areas in the particulate trap where it would be inefficient to absorb microwave energy. By strategically locating structures to accumulate particulate matter and/or microwave-absorbing materials, microwaves may be used efficiently at the locations they are most needed to initiate the burn-off of particulates and heat catalyst materials.

DESCRIPTION OF THE PREFERRED EMBODIMENT

Figure 1:
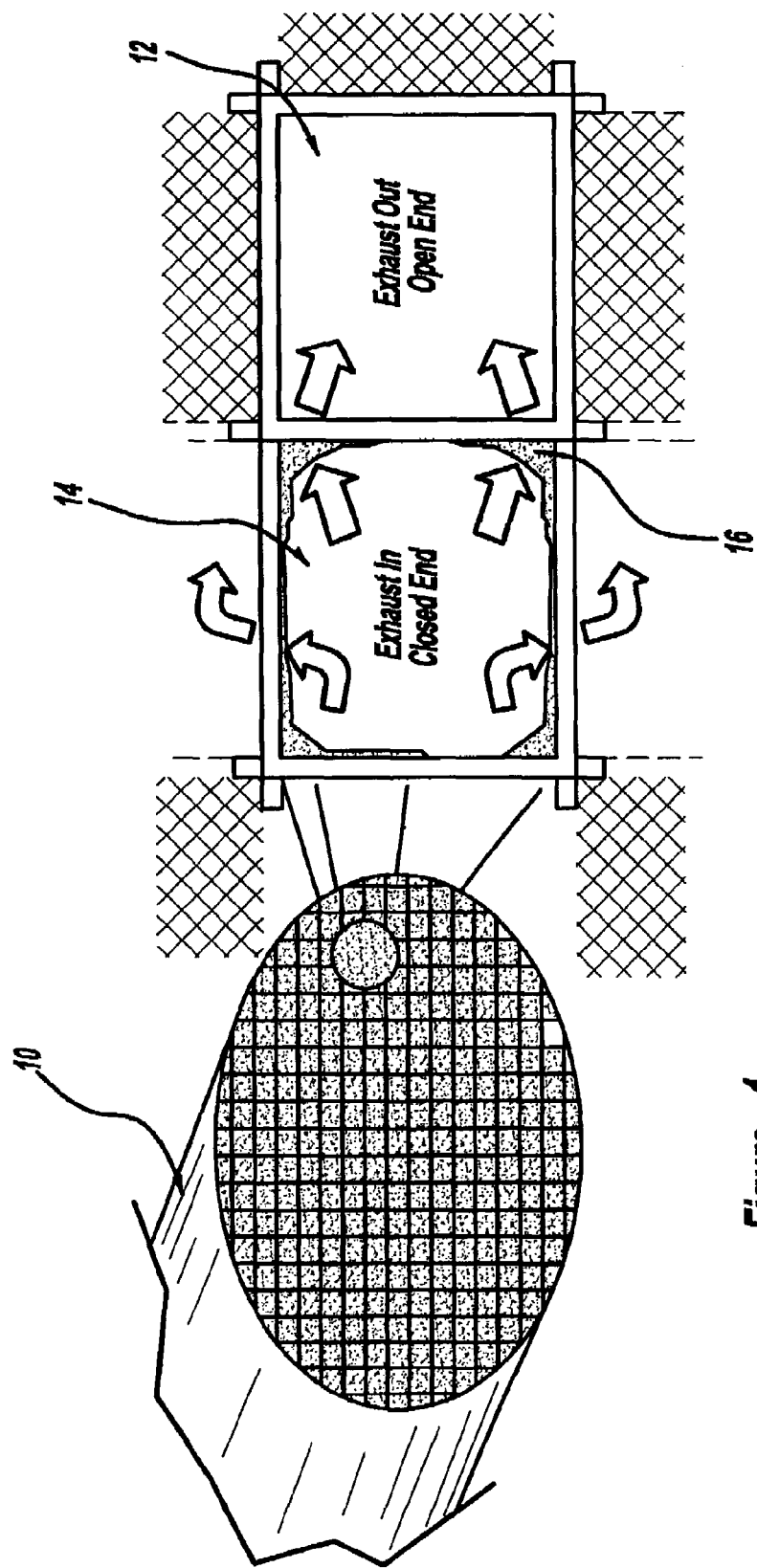
FIG. 1 is a diagrammatic drawing of a wall flow monolith particulate trap.

FIG. 1 is a diagrammatic drawing of a wall flow monolith particulate trap 10 used in diesel applications. The particulate trap 10 includes alternating closed cells/channels 14 and open cells/channels 12. Exhaust gases such as those generated by a diesel engine enter the closed end channels 14, depositing particulate matter 16 and exiting through the open channels 12. The particulate trap 10 structure is preferably comprised of a porous ceramic honeycomb wall of cordierite material, but any ceramic honeycomb material is considered within the scope of the present invention.

Figure 2:
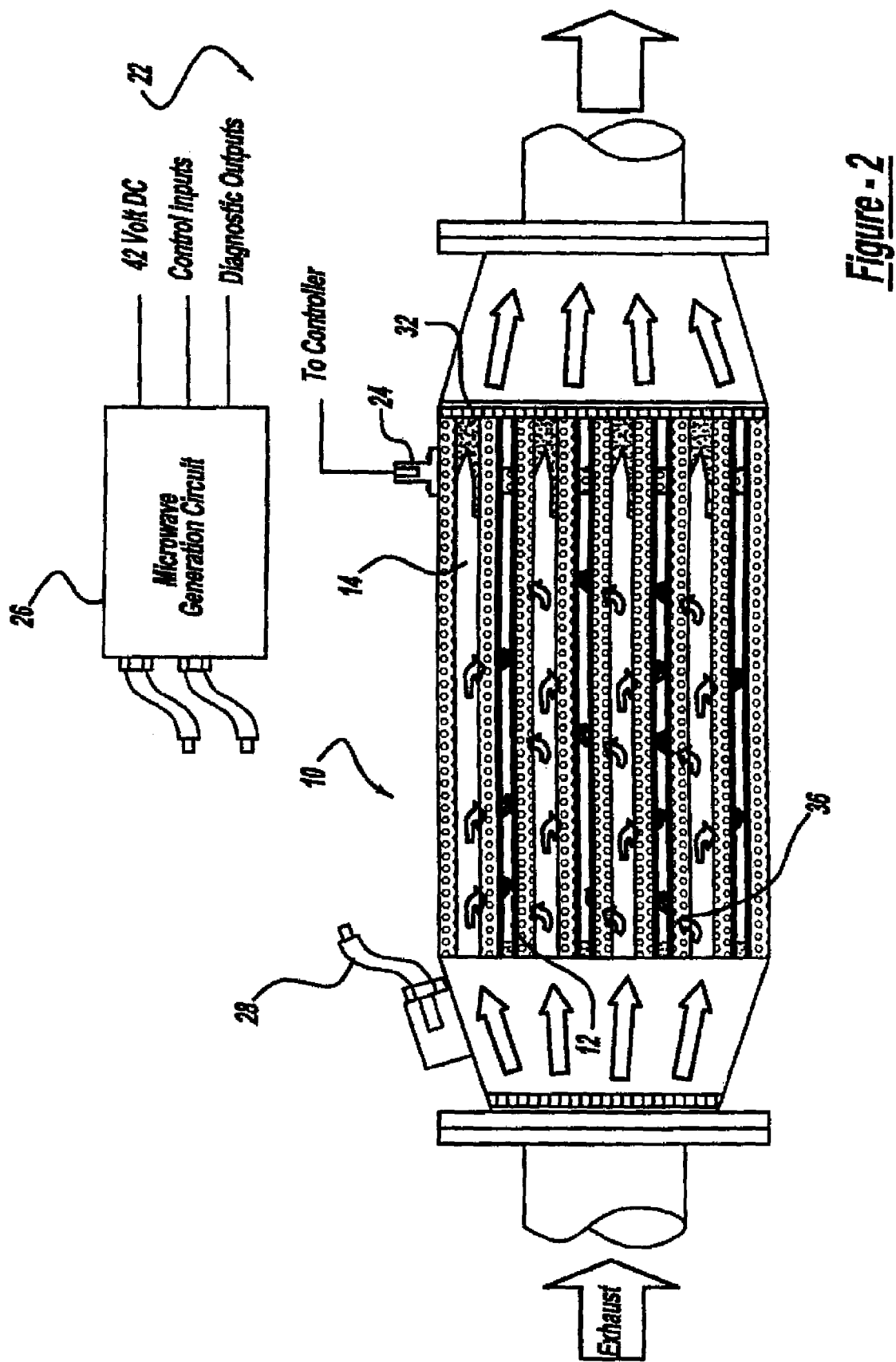
FIG. 2 is a diagrammatic drawing of the microwave regeneration system of the present invention.

FIG. 2 is a diagrammatic drawing of the microwave system 22 of the present invention. The system 22 includes a particulate trap 10 placed in the exhaust flow of a diesel engine. A microwave power source 26 and microwave antenna 28 direct the microwaves to the particulate trap 10. A thermistor, thermocouple or other temperature measuring device 24 provides temperature readings of the particulate trap to a controller. The controller may comprise a powertrain controller used to control an internal combustion engine and emission controls, but any other controller is considered within the scope of the present invention. In one embodiment of the present invention, a metallic honeycomb 32 is used to block microwaves exiting the particulate trap 10.

The open end channels of the particulate trap 10 are coated with a NOx trapping catalyst, and microwave-absorbing materials are strategically placed in the closed end channels to ignite particulate matter upon the application of microwave radiation. The microwave-absorbing materials include, but are not limited to, concentrated carbon, silicon carbide, ferrites and self-mode-stirring (SMS) materials having Curie temperatures.

Microwave-absorbing materials and concentrated particulate deposits generate heat in response to incident microwaves to initiate the burn off of particulates in the particulate trap 10. Materials such as cordierite that are transparent to microwaves are preferably used for the basic construction of the particulate trap 10 housing and other areas in the particulate trap 10 where it would be inefficient to absorb microwave energy. As the cordierite does not absorb microwave energy, the microwaves will "bounce" around until they are incident upon the particulate deposits. The temperature of the particulate trap 10 may be regulated by the timed build-up of particulates and by controlling the application of the microwave energy.

Figure 3:
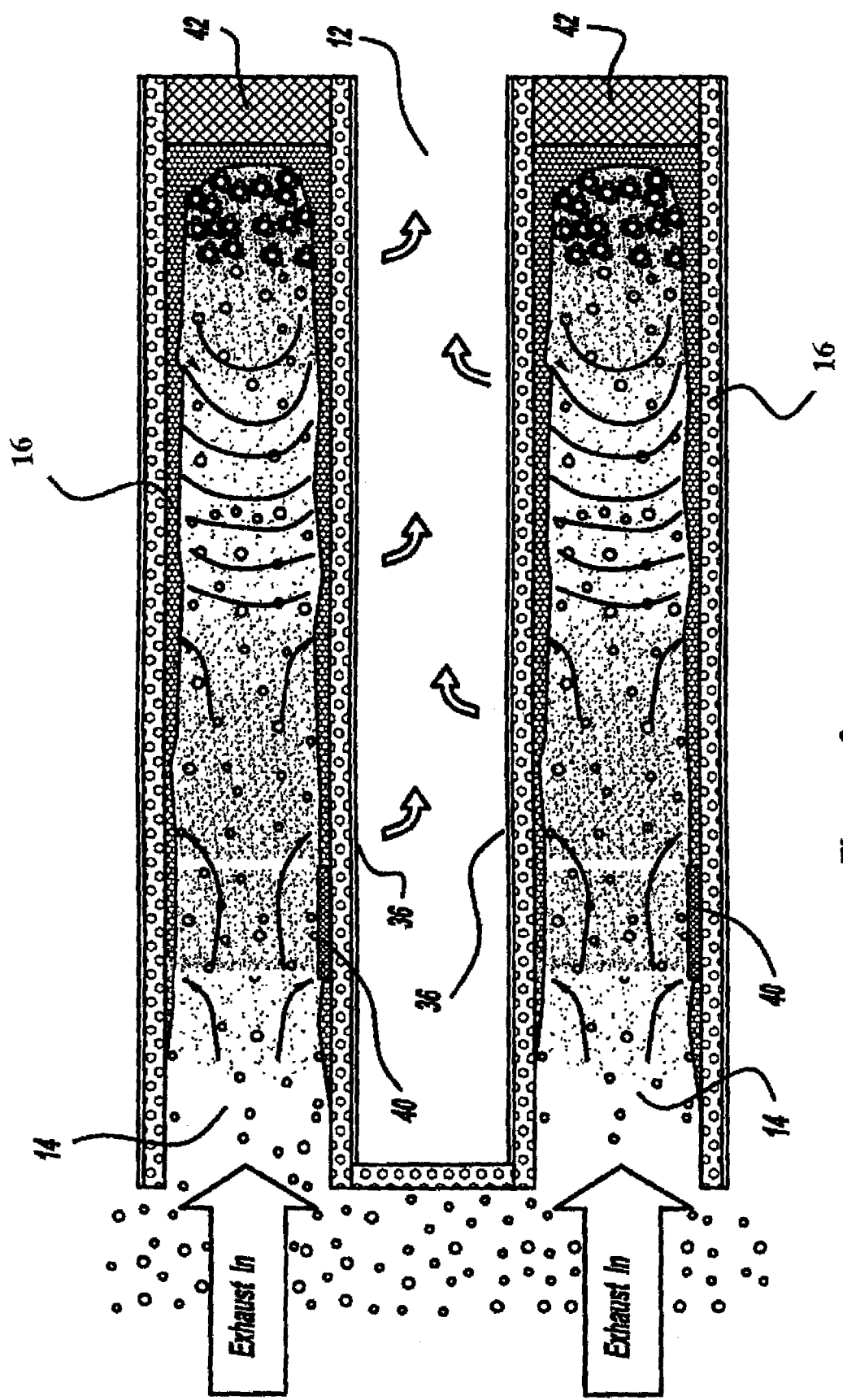
FIG. 3 is a diagrammatic drawing illustrating a particulate trap of the present invention.

FIG. 3 is a diagrammatic drawing of the particulate trap 10 configured with the structures 40 and end plugs 42 comprising microwave-absorbing materials. Diesel exhaust filled with particulates flows through the particulate trap, depositing particulates 44 upon the walls of the particulate trap 10 with concentrations of particulate matter occurring in the vicinity of the end plug 42. The microwave field density will inherently focus on the most microwave-absorbent materials found in the particulate deposits, structures 40, and end plugs 42. The particulate concentrations, structures 40, and end plugs 42 create a hot spot or ignition point for the microwave energy that burn off particulates deposited on the walls of the particulate trap 10. The ignition of a relatively small amount of particulates, that are ignited by the particulate concentrations, will be leveraged to burn a relatively large amount of particulates. The thermal energy generated by the burn-off of particulates will heat a NOx trapping catalyst 36 coated or doped onto the walls of the open end channels 12. The heating of the NOx catalyst will allow it to more efficiently reduce NOx when soot combustion products are present.

Figure 5:
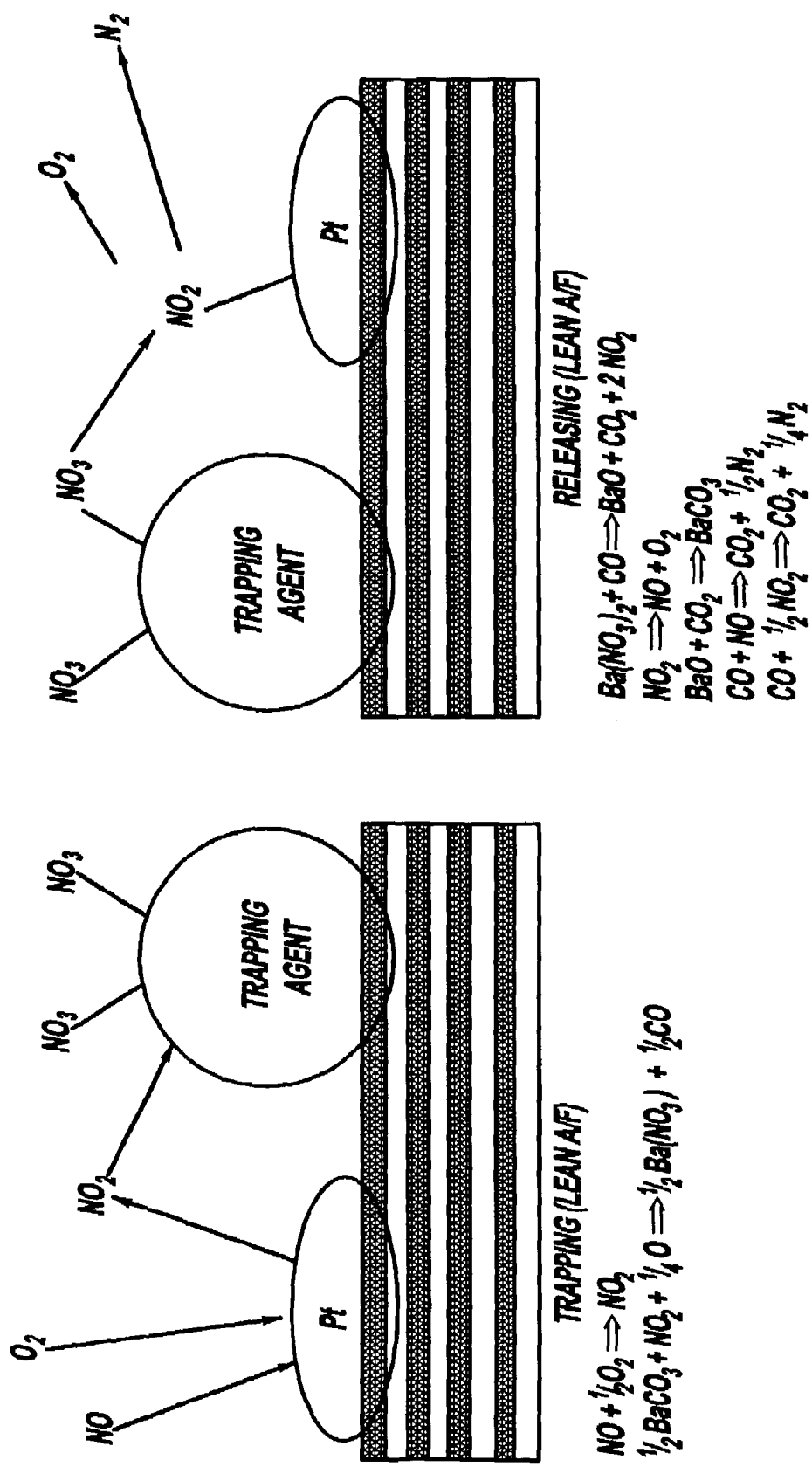
FIG. 5 is a process drawing of the NOx adsorber chemistry in the present invention.

Referring to FIG. 5, the NOx catalyst layers 36 preferably utilize barium as a trapping agent for NOx compounds during lean operating conditions and release NOx compounds during rich conditions. The hydrocarbons and carbon monoxide in the relatively rich exhaust stream combine with the NOx and are converted to nitrogen and oxygen.

Figure 4:
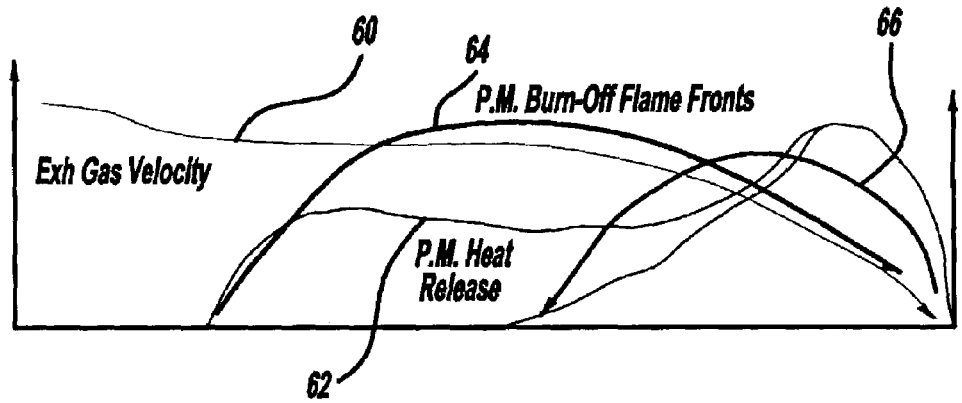
FIG. 4 is a plot detailing the exhaust gas velocity, flame front and heat release generated by the end plug heating illustrated in FIG. 3.

FIG. 4 illustrates the performance of the particulate trap shown in FIG. 3. The exhaust gas velocity shown as plot 60 will decrease as a function of the distance of the closed end channel. The heat shown as plot 62 generated by the particulate heat release will initially be located near the structures 40 and near the end plugs 42, and then propagate as a burn-off flame front shown by arrows 64 and 66.

Figure 6:
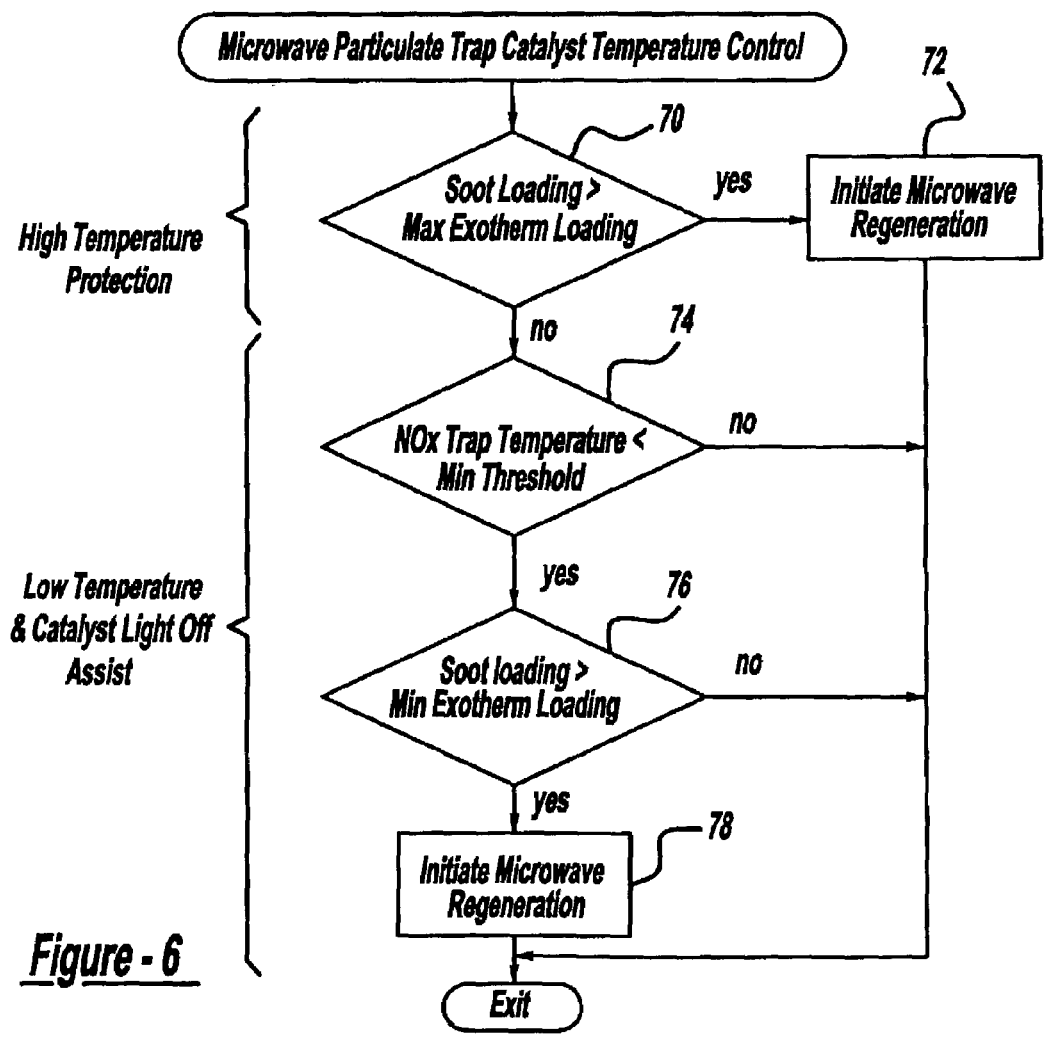
FIG. 6 is a flow chart of a preferred method of the present invention.

FIG. 6 is a flowchart of a preferred method of a present invention. A controller will determine when to enter the particulate filter regeneration method based upon the time the vehicle has been operated. Decision block 70 determines if the soot or particulate loading in the particulate filter trap 10 is greater than the maximum exotherm loading needed to regenerate the particulate filter trap 10. If true, the method will initiate microwave regeneration of the particulate trap at block 72. Otherwise, the method will continue to decision block 74 to determine if the NOx temperature is less than the minimum operating threshold. If false, the method will end. Otherwise, the method will continue to block 76 to determine if the soot or particulate loading is greater than the minimum exotherm loading to regenerate the particulate filter 10. If false, the method will end. Otherwise, the method will initiate microwave regeneration of the particulate filter 10 at block 78. Blocks 70 and 72 constitute the high temperature protection of the particulate filter, and blocks 74, 76 and 78 constitute the low temperature NOx catalyst light-off assist.

In alternate embodiments of the present invention, structures such as walls may be integrated into the closed end channels to generate a preferential build-up of particulate matter. Microwaves incident upon particulate deposits initiate the burn off of the particulates to clear the walls of the particulate trap 10. The ignition of a relatively small amount of particulates, that are ignited by the particulate concentrations, will be leveraged to burn a relatively large amount of particulates.

While this invention has been described in terms of some specific embodiments, it will be appreciated that other forms can readily be adapted by one skilled in the art. Accordingly, the scope of this invention is to be considered limited only by the following claims.

The invention claimed is:

1. A particulate filter system for an internal combustion engine comprising:
    a particulate trap;
    microwave-absorbing materials located in said particulate trap;
    a NOx catalyst located in said particulate trap;
    a temperature sensor that monitors a temperature of said particulate trap; and
    a controller that controls microwave radiation from a microwave power source to said microwave-absorbing materials based on said temperature of said particulate trap, wherein said controller selectively initiates said microwave radiation when said temperature of said particulate trap is below a minimum operating threshold of said NOx catalyst.

2. The particulate filter system of claim 1 wherein said microwave-absorbing material is located in an end plug of said particulate trap.

3. The particulate filter of claim 1 wherein said particulate trap is comprised of a microwave-transparent material.

4. The particulate filter of claim 3 wherein said microwave-transparent material is cordierite.

5. The particulate filter of claim 1 wherein said microwave-absorbing material is silicon carbide.

6. The particulate filter of claim 1 wherein said microwave-absorbing material has a Curie temperature threshold to absorb microwaves and generate heat to burn particulates.

7. The particulate filter of claim 1 wherein said microwave-absorbing material is self-mode-stirring material.

8. The particulate filter system of claim 1 wherein said temperature sensor is located in said particulate trap.

9. The particulate filter system of claim 1 wherein said controller determines a particulate loading in said particulate trap based on an operating time of said internal combustion engine and controls said microwave radiation based on said particulate loading.

10. The particulate filter system of claim 9 wherein said controller selectively initiates said microwave radiation when said particulate loading is greater than a minimum exothermic loading.

11. The particulate filter system of claim 9 wherein said controller initiates said microwave radiation when said particulate loading is greater than a maximum exothermic loading.

* * * * *